(No Model.)
W. ASHBY.
ATTACHMENT FOR HAND RAKES.
No. 531,295. Patented Dec. 25, 1894.
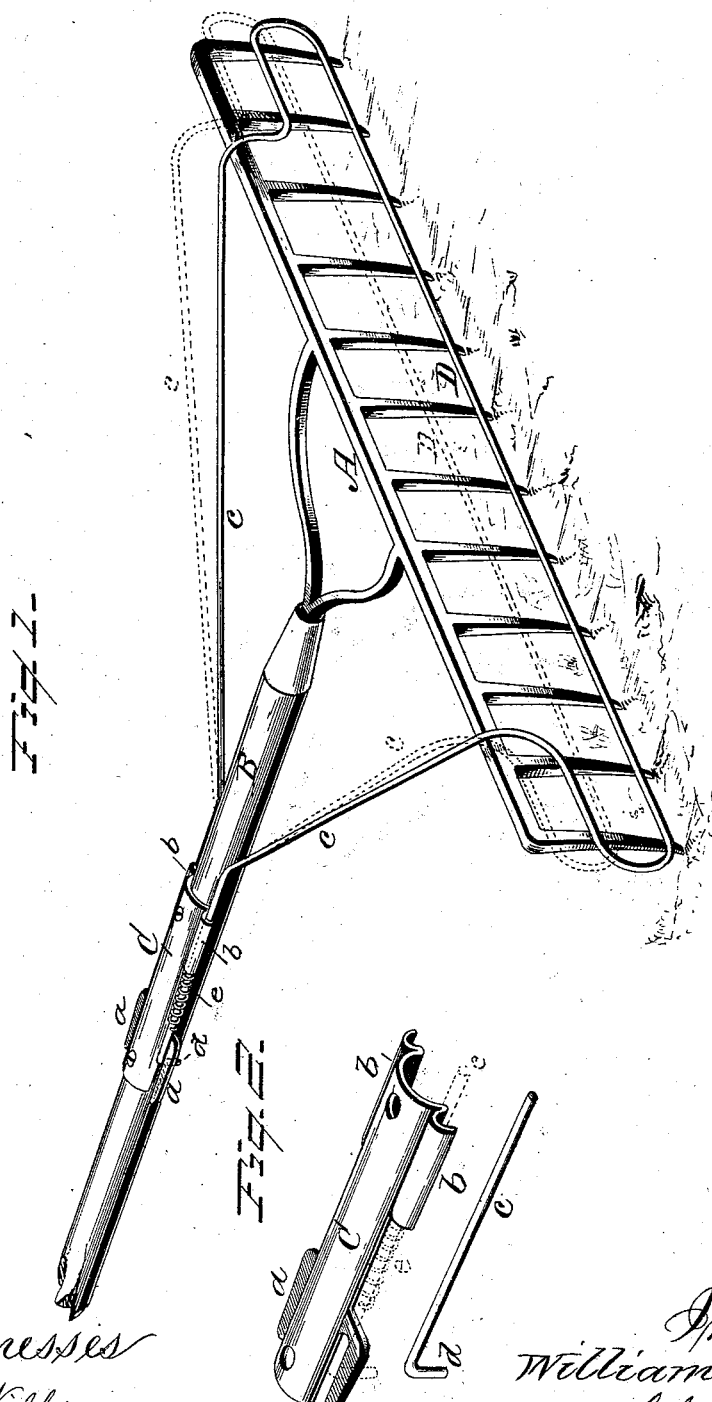

UNITED STATES PATENT OFFICE.

WILLIAM ASHBY, OF LAFAYETTE, INDIANA.

ATTACHMENT FOR HAND-RAKES.

SPECIFICATION forming part of Letters Patent No. 531,295, dated December 25, 1894.

Application filed March 31, 1894. Serial No. 505,837. (No model.)

*To all whom it may concern:*

Be it known that I, WILLIAM ASHBY, a citizen of the United States, residing at Lafayette, in the county of Tippecanoe and State of Indiana, have invented certain new and useful Improvements in Attachments for Hand-Rakes; and I do hereby declare that the following is a full, clear, and exact description of the same, reference being had to the annexed drawings, making a part of this specification, and to the letters of reference marked thereon.

The present invention has for its object to provide an attachment to hand or garden rakes for keeping the teeth thereof free from clogging and effectually remove from the teeth any accumulation of grass or other material over which the rake passes when in use.

The invention consists in an attachment constructed substantially as shown in the drawings and hereinafter described and claimed.

Figure 1 of the drawings represents a perspective view of a hand or garden rake with my improved attachment in position thereon; Fig. 2, detail views in perspective showing the metal plate for attachment to the handle of the rake, and the hooked end of one of the arms of the spring wire frame which clears the teeth of any obstructions.

In the accompanying drawings A represents the rake-head and B the handle which may be of the ordinary construction and connected together in any well known and preferred manner. To the handle B is suitably connected a clamping-plate C having at its rear end guides $a$ upon each side of the plate and extending longitudinally thereof. At the front end of the plate and upon each side thereof are curved seats $b$ which are on line with the guides. This clamping-plate may be struck up from a single piece of sheet metal or constructed in any other well known manner found best adapted to the purpose.

A frame D constructed of spring wire is formed with arms $c$ which terminate in suitable hooks $d$ or equivalent devices at their rear ends, said hooks engaging with the guides $a$ upon the sides of the plate C and the arms $c$ engaging with the curved seats $b$, as shown more clearly in dotted lines of Fig. 2.

The frame D may be of any desirable form and construction and when in its normal position is intended to assume the position shown in full lines of Fig. 1.

The guides $a$ in the present instance are preferably formed in the shape of claws, but any device or means may be substituted that will serve the purpose of guides for the arms $c$ when moving forward and backward when the frame is forced up or down. The seats $b$ form fulcrums for the arms $c$ when the frame A is forced up in the position shown in Fig. 1.

When the rake is in use and the teeth forced down into the grass or other material being raked, the pressure upon the frame D will force it upward to the position indicated in dotted lines of Fig. 1, which allows the teeth to enter the grass or other material and as soon as the rake is full and raised up, the frame D will resume its normal position and free the teeth of any obstruction.

The springs $e$ are especially adapted to rakes in which the teeth are curved or bulge outward, and when the frame D is forced up by the accumulation of grass between the teeth, the outward curve thereof will force the frame outward and when the rake is elevated and the grass disengaged therefrom, the springs will draw the frame back to its normal position.

The teeth shown in Fig. 1 of the drawings are only slightly curved but the greater the curve the more service the springs will be in bringing the frame back to its normal position. When the device is applied to a rake with straight teeth, the springs may be dispensed with.

The within described attachment to hand rakes provides a very simple and effective device for clearing the teeth of any obstruction while the rake is in use.

There are many changes or modifications in the spring wire frame and the clamping-plate that could be made without departing from the principle of the invention and still render the attachment equally as effective.

Having now fully described my invention, what I claim as new, and desire to secure by Letters Patent, is—

1. An attachment to hand or garden rakes, consisting of a suitable frame having spring arms with hooks at their ends, a plate for attachment to the handle of the rake and provided with guides and seats for the arms, substantially as and for the purpose described.

2. An attachment to hand or garden rakes, consisting of a spring wire frame of any suitable form having arms which terminate in hooks, a clamping plate connected to the handle of the rake and provided with guides for said hooks and seats for the arms, and coiled springs encircling the arms between the hooks thereof and the seats upon the plate, substantially as and for the purpose set forth.

In testimony that I claim the above I have hereunto subscribed my name in the presence of two witnesses.

WILLIAM ASHBY.

Witnesses:
NEVILLE I. THROCKMORTON,
WILLIAM M. SIMPSON.